(12) United States Patent
Liansky et al.

(10) Patent No.: US 9,323,713 B2
(45) Date of Patent: Apr. 26, 2016

(54) METHOD FOR AUTOMATIC ESTABLISHING WIRELESS CONNECTIVITY BETWEEN A MOBILE WIRELESS DEVICE AND A TARGET SCREEN FOR MULTIMEDIA DATA STREAMING

(71) Applicant: Screenovate Technologies Ltd., Raanana (IL)

(72) Inventors: Leonid Liansky, Maple (CA); Yuval Luzon, Acco (IL)

(73) Assignee: SCREENOVATE TECHNOLOGIES LTD., Ra'anana (IL)

( * ) Notice: Subject to any disclaimer, the term of this patent is extended or adjusted under 35 U.S.C. 154(b) by 237 days.

(21) Appl. No.: 13/676,252

(22) Filed: Nov. 14, 2012

(65) Prior Publication Data

US 2013/0124740 A1  May 16, 2013

Related U.S. Application Data

(60) Provisional application No. 61/559,283, filed on Nov. 14, 2011.

(51) Int. Cl.
*G06F 15/16* (2006.01)
*H04M 1/725* (2006.01)

(52) U.S. Cl.
CPC ............ *G06F 15/16* (2013.01); *H04M 1/7253* (2013.01); *H04M 2250/06* (2013.01); *H04M 2250/16* (2013.01); *H04M 2250/52* (2013.01)

(58) Field of Classification Search
CPC .................. H04M 1/7253; G06F 11/0742
USPC .............. 235/375; 348/14.03; 705/44, 64; 382/100, 321; 726/1; 713/179; 455/41.2; 340/10.1; 709/228
See application file for complete search history.

(56) References Cited

U.S. PATENT DOCUMENTS

| | | | |
|---|---|---|---|
| 8,806,567 B1 * | 8/2014 | Venable, Sr. | 726/1 |
| 2009/0108057 A1 * | 4/2009 | Mu et al. | 235/375 |
| 2010/0082490 A1 * | 4/2010 | Rosenblatt et al. | 705/64 |
| 2011/0150266 A1 * | 6/2011 | Hohndel | 382/100 |
| 2011/0156879 A1 * | 6/2011 | Matsushita et al. | 340/10.1 |
| 2011/0183612 A1 * | 7/2011 | Bregman-Amitai et al. | 455/41.2 |
| 2012/0061458 A1 * | 3/2012 | Bahr et al. | 235/375 |
| 2012/0096277 A1 * | 4/2012 | Perez Soria | 713/179 |
| 2012/0128267 A1 * | 5/2012 | Dugan et al. | 382/321 |
| 2012/0162351 A1 * | 6/2012 | Feldman et al. | 348/14.03 |
| 2012/0205431 A1 * | 8/2012 | Chang et al. | 235/375 |
| 2012/0290478 A1 * | 11/2012 | Crofts et al. | 705/44 |
| 2013/0134212 A1 * | 5/2013 | Chang | 235/375 |

\* cited by examiner

*Primary Examiner* — Dustin Nguyen
(74) *Attorney, Agent, or Firm* — Browdy and Neimark, PLLC

(57) ABSTRACT

A method for automatically establishing a wireless connection between a receiving screen and a mobile wireless device to enable streaming of multimedia data is provided herein. The method comprises the steps of: (i) creating a dynamic image code which includes data enabling wireless connection that is associated with the target screen device; (ii) displaying said image code on the target screen device, until a connection with a mobile wireless device is established; (iii) capturing said dynamic image code by the mobile wireless device; (iv) decoding the dynamic code for retrieving the data enabling wireless connection that is associated with the target screen; and (v) establishing a wireless connection between a target screen device and a mobile wireless device for enabling data streaming by the mobile wireless device based on the retrieved enabling data wireless connection.

11 Claims, 3 Drawing Sheets

METHOD FOR AUTOMATIC ESTABLISHING WIRELESS CONNECTIVITY BETWEEN A MOBILE WIRELESS DEVICE AND A TARGET SCREEN FOR MULTIMEDIA DATA STREAMING

CROSS-REFERENCE TO RELATED PATENT APPLICATIONS

This application claims the benefit of U.S. Provisional patent application No. 61/559,283 filed on Nov. 14, 2011 which is incorporated herein by reference in its entirety.

BACKGROUND

1. Technical Field

The present invention generally relates to the field of streaming application data to a target screen.

2. Discussion Of Related Art

Initiating parameters are required to establish wireless communication between a mobile wireless device and a screen device. There are existing solutions in the market for wirelessly connecting such devices. However, when the devices were not pre-programmed to established wireless communication, these solutions require a user to insert initiating parameters to establish the wireless connection between the devices.

BRIEF SUMMARY

According to some embodiments of the invention, a method for automatically a method for automatically establishing a wireless connection between a target screen device and a mobile wireless device to enable streaming of multimedia data is provided herein. The method is comprising the steps of: (i) creating a dynamic image code which includes specific data which enables establishing wireless connection of the mobile device with the target screen device; (ii) displaying said image code on the target screen device, until a connection with a mobile wireless device is established; (iii) capturing said dynamic image code by the mobile wireless device; decoding the dynamic code for retrieving the specific data that are associated with the target screen device; and (iv) establishing a wireless connection between the target screen device and the mobile wireless device for enabling multimedia data streaming by the mobile wireless device based on the retrieved specific data.

According to some embodiments of the invention, the method further includes the step of presenting all available target screen devices by a User Interface (UI) to allow the correct identification of the target screen device.

According to some embodiments of the invention, the method further includes the step of displaying data that is streamed from the mobile wireless device on the target screen device.

According to some embodiments of the invention, the method further includes the step of displaying a dynamic image code on the target screen device when a connection between a mobile wireless device and the target screen device is terminated.

According to some embodiments of the invention, the specific data includes identification code of the target screen device, wherein the identification code of the target screen device is used to retrieve wireless connection parameters from data storage.

According to some embodiments of the invention, the specific data includes wireless connection parameters which are required for establishing communication between the mobile device and target screen.

According to some embodiments of the invention, a system for automatically establishing a wireless connection between a target screen device and a mobile wireless device to enable streaming of multimedia data is provided herein. The system comprising: (i) a mobile wireless device comprising: (a) a dynamic image code decoding software; (b) a camera; (c) data; (d) a target screen device. The target screen device is creating a dynamic image code which includes specific data which enables wireless connection of the mobile device with the target screen device. The target screen device is displaying said image code on the target screen device, until a connection with a mobile wireless device is established. The mobile wireless device is capturing said dynamic image code. The mobile wireless device is decoding the dynamic code for retrieving the wireless connection parameters that are associated with the target screen device, and the mobile wireless device is establishing a wireless connection between the target screen device and the mobile wireless device for enabling multimedia data streaming by the mobile wireless device based on the specific data.

According to some embodiments of the invention, the dynamic image code decoding software is running on the mobile wireless device.

According to some embodiments of the invention, the dynamic image code decoding software is a Software As a Service (SAAS) that is running on a cloud.

According to some embodiments of the invention, the mobile wireless device further includes a User Interface (UI) that presents all available target screen devices in order to allow the correct identification of the target screen device.

According to some embodiments of the invention, the target screen device is displaying data that is streamed from the mobile wireless device.

According to some embodiments of the invention, the target screen device is displaying a dynamic image code when a connection between a mobile wireless device and the target screen device is terminated.

According to some embodiments of the invention, the dynamic image code parameters that enable connection between a mobile wireless device and the target screen device, including at least one of: Media Access Control (MAC) address, Service Set Identifier (SSID), WiFi encryption key, PIN-code, Internet Protocol (IP) address, stream encryption key and other parameters.

According to some embodiments of the invention, the specific data includes identification code of the target screen device, wherein the identification code of the target screen device is used to retrieve wireless connection parameters from data storage.

According to some embodiments of the invention, the specific data includes wireless connection parameters which are required for establishing communication between the mobile device and target screen.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1A:
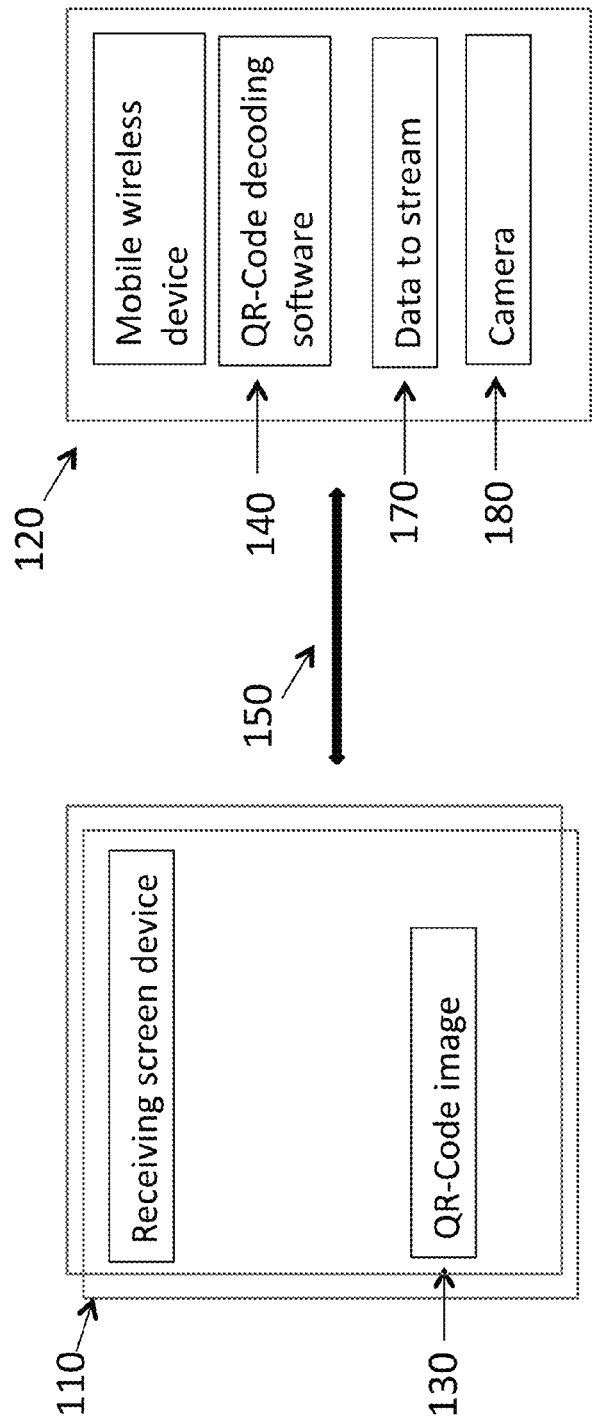
FIG. 1A is a block diagram illustrating a mobile wireless device that is connecting to one from a multiple of receiving screen devices, according to some embodiments of the invention.

Before explaining at least one embodiment of the invention in details, it is to be understood that the invention is not limited in its application to the details of construction and the arrangement of the components set forth in the following description or illustrated in the drawings. The invention is applicable to other embodiments and/or may be practiced or carried out in various ways. Also, it is to be understood that the phraseology and terminology employed herein is for the purpose of description and should not be regarded as limiting.

For a better understanding of the invention, the usages of the following terms in the present disclosure are defined in a non-limiting manner:

The term "Mobile wireless device" as used herein in this application, is defined as a mobile wireless device with capability of wireless communication and capability to stream multimedia data to a screen that is external to the mobile wireless device (e.g. a mobile phone or a tablet device).

The term "Receiving (target) screen device" as used herein in this application, is defined as any external display device that can be used to show multimedia data that is streamed from a mobile wireless device via a wireless link (e.g. TV screen, computer screen, screen of a tablet device, car computer etc.).

The term "barcode" as used herein in this application, is defined as an optical machine-readable representation of data relating to the object to which it is attached.

Streaming multimedia data from a mobile wireless device to an external screen such as TV screen, computer screen or any other screen may improve user experience. For example, screen mirroring, video streaming etc. The streaming of multimedia data may be performed over a wireless link.

However, there are several challenges when connecting a mobile wireless device to another wireless device. One challenge may be related to required parameters such as: Media Access Control (Mac) address, a Service Set Identifier (SSID), PIN-code, an encryption key, the receiver's Internet Protocol (IP) address etc.

Commonly, special discovery protocols are used for this purpose. These protocols are allowing two peer devices to connect, however in case there are multiple receiving devices which are visible to a mobile wireless device over Wi-Fi (i.e. a Wireless Local Area Network (WLAN)) selection of the receiving device and establishing a connection to it may be challenging.

Another challenge, in case there are multiple receiving screen devices which are visible to a mobile wireless device over Wi-Fi, is to present via a User Interface (UI) to a mobile wireless device, all available receiving screen devices in order to allow the correct identification of the receiving screen device.

There are solutions to the challenges that were mentioned above, however these solutions are disadvantaged because they may increase connection time and may increase connection error probability.

According to some embodiments of the present invention, methods and systems which use Quick Response (QR) Code technology are provided herein. The methods and systems use QR-code technology to transfer required connection information from a receiving screen device to a mobile wireless device. QR-Code image is a two-dimensional barcode that can be used to encode any kind of data yielding an image. It provides fast and reliable readability and is supported by standard existing third-party software implementations on various device platforms.

FIG. 1A is a block diagram illustrating a mobile wireless device 120 that is connecting to one from a multiple of receiving screen devices 110, according to some embodiments of the invention.

According to some embodiments of the present invention, As soon as a connection 150 is terminated or before a first connection 150 is established, the receiving screen device 110 starts displaying a QR-Code image 130 (i.e. dynamic image code) that includes information that is required for establishing a connection with the receiving screen device 110.

According to some embodiments of the present invention, a mobile wireless device 120 may capture a QR-Code image 130 that is displayed on a receiving screen device 110 by using its built-in camera 180. Data that is stored in the QR-Code image 130 may be decoded using QR-Code decoding software 140, that may be running on the mobile wireless device 120 or running by a Software As a Service (SAAS) on a cloud.

According to some embodiments of the present invention, a QR-Code image 130 may be displayed on a receiving screen device 110 (i.e. target screen device) and the mobile wireless device 120 may connect to it by pointing its camera 180 to the receiving screen device 110 and capturing a picture which later on will be decoded by the QR-Code decoding software 140. A User Interface (UI) in the mobile wireless device may present all available receiving screen devices in order to allow the correct identification of the receiving screen device.

According to yet some other embodiments of the present invention, the QR-Code image 130 is dynamically generated by the receiving screen device 110. The data that was stored in the QR-Code and was decoded is used to establish a wireless connection 150 between the mobile wireless device 120 and the receiving screen device 110.

According to yet some other embodiments of the present invention, the QR-Code image 130 may include information regarding identification of the receiving screen device 110 (i.e. target screen device). Parameters for establishing a wireless connection between the mobile wireless device 120 and the receiving screen device 110 may be stored in a database for each receiving screen device 110 by its identification. The parameters for establishing a connection may be retrieved by the mobile wireless device 120 by using the identification of the receiving screen device 110. The database may be located remotely on a server or on the mobile wireless device 120.

Figure 1B:
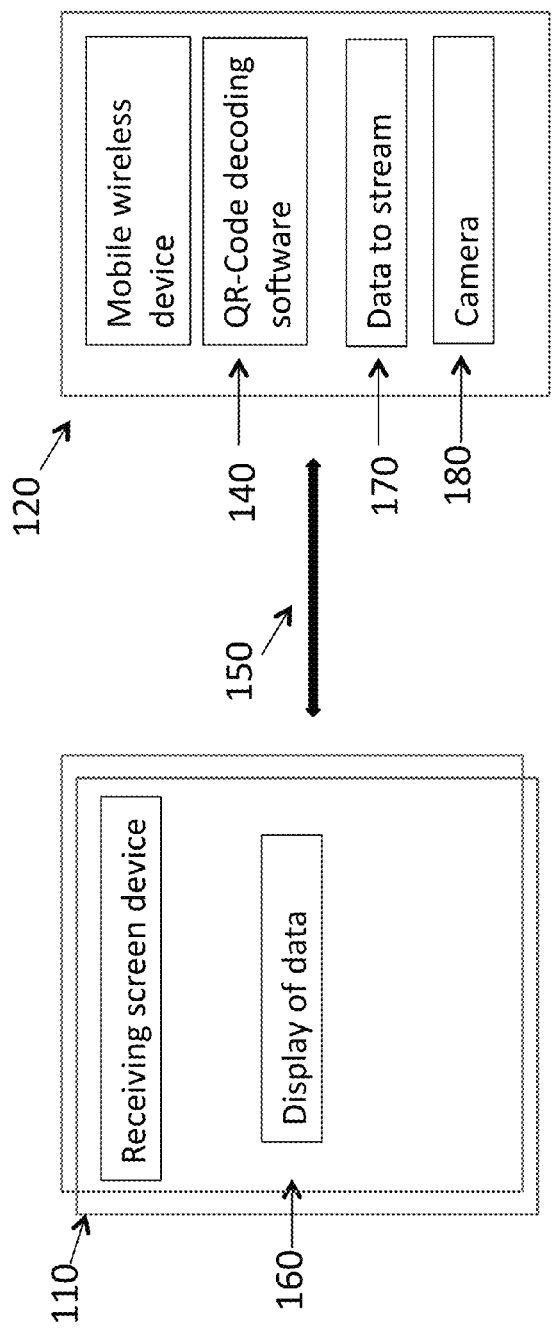
FIG. 1B is a block diagram illustrating a mobile wireless device that is streaming data to one of the multiple receiving screen devices, according to some embodiments of the invention.

FIG. 1B is a block diagram illustrating a mobile wireless device 120 that is streaming data to one of the multiple receiving screen devices 110, according to some embodiments of the invention.

According to some embodiments of the present invention, once a wireless connection 150 between a mobile wireless device 120 and one of the multiple receiving screen devices 110 is established, the receiving screen device 110 starts displaying the multimedia data or any other type of data 160 that is streamed from the mobile wireless device 110. No additional user input is required and the connection 150 is established automatically once the mobile wireless device's software 140 detects and decodes the QR-Code image 130 in FIG. 1A. As soon as the connection 150 is terminated, the receiving screen device 110 starts displaying the QR-Code image 130 in FIG. 1A that is required to establish a connection 150 with the receiving screen device 110.

Figure 2:
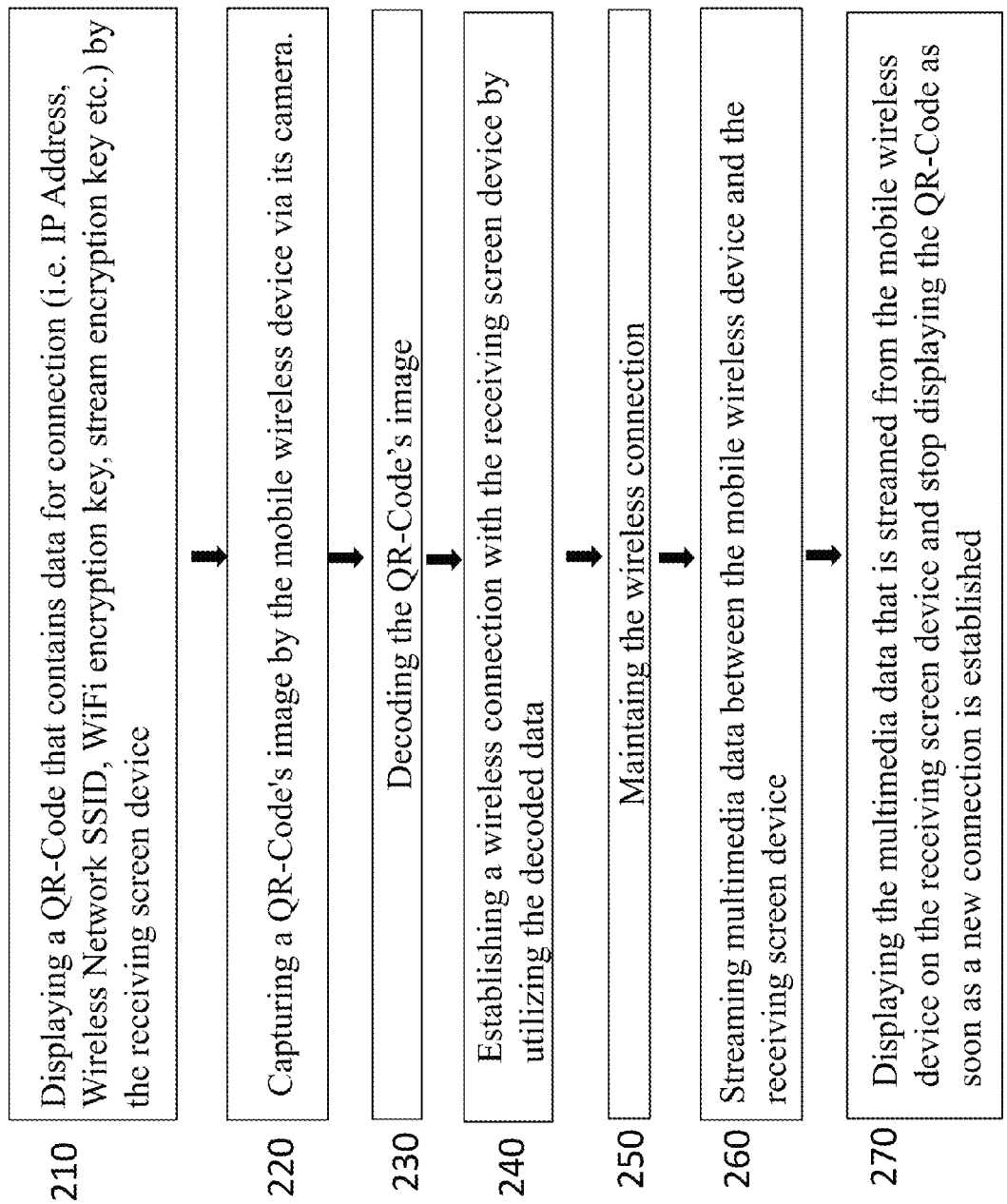
FIG. 2 is a flowchart illustrating a process of automatically establishing connectivity between a mobile wireless device and a target screen for multimedia data streaming, according to some embodiments of the invention.

FIG. 2 is a flowchart illustrating a process of automatically establishing connectivity between a mobile wireless device 120 in FIG. 1A and a target screen 110 in FIG. 1A for video streaming, according to some embodiments of the invention.

According to some embodiments of the present invention, the data that was decoded and stored in the QR-Code image may include parameters such as Mac address, SSID, WiFi encryption key, PIN-code, IP address, stream encryption key and other parameters. The generated QR-Code image (i.e. dynamic image code) is displayed on the receiving screen device (i.e. target screen device) until a connection with a mobile wireless device is established (stage 210).

According to yet some other embodiments of the present invention, the connection is established by capturing the visual image of the QR-Code by the camera of the mobile wireless device, when the camera of the mobile wireless device is being pointed to the receiving screen device (stage 220).

Next, the image that was received from the mobile wireless device's camera is decoded by the mobile wireless device's software (stage 230) and the decoded data is used to establish a wireless connection between the mobile wireless device and the receiving screen device (stage 240). Additionally, the decoded data may be used to maintain the connection and to stream the data between the mobile wireless device and the receiving screen device (e.g. stream encryption key used to encrypt the data on an ongoing basis) (stage 250).

As soon as a new connection is established, the receiving screen device stops displaying the QR-Code and data streamed from the mobile wireless device to it (stage 260) is displayed (stage 270). As soon as the connection is terminated, a new QR-Code image is generated by the receiving screen device with the same or newly generated connection data parameters. For example, the same SSID, but new stream encryption key.

There could be defined a new standard for the representation of the data used to dynamically generate QR-Code images in the proposed solution. Generally, QR-Code allows encoding any data that is represented in a form of a string. The new standard could specify the exact format of such string in order to allow uniform way to establish connection by different devices.

Ready-to-use third party components may be used to generate the image of QR-Code to be displayed on receiving screen device, as well as to decode the QR-Code's image captured by the mobile wireless device's camera.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention.

Furthermore, it is to be understood that the invention can be carried out or practiced in various ways and that the invention can be implemented in embodiments other than the ones outlined in the description above. It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element. It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalent.

What is claimed is:

1. A method for automatically establishing a wireless connection between a target screen device and a mobile wireless device to enable streaming of multimedia data, said method comprising the steps of:

automatically creating an initial dynamic image code which includes specific data which enables establishing wireless connection of the mobile device with the target screen device;

displaying said initial dynamic image code on the target screen device, until a connection with a mobile wireless device is established;

capturing said initial dynamic image code by the mobile wireless device;

decoding the initial dynamic image code for retrieving the specific data that are associated with the target screen device, wherein the initial dynamic image code includes connection parameters including wireless network parameters and a stream encryption key;

establishing an initial wireless connection between the target screen device and the mobile wireless device for enabling multimedia data streaming by the mobile wireless device based on the retrieved specific data;

automatically generating and displaying a new dynamic image code on the target screen device when a connection between a mobile wireless device and the target screen device is terminated, wherein the new dynamic image code comprises specific data that includes wireless network parameters having at least one value equal to at least one value of the wireless network parameters of the initial dynamic image code and a new stream encryption key, and restoring the wireless connection between the target screen device and the mobile wireless device for enabling continued multimedia data streaming by the mobile wireless device based on the specific data from the new dynamic image code.

2. The method of claim 1, wherein the method further includes the step of presenting all available target screen devices by a User Interface (UI) to allow the correct identification of the target screen device.

3. The method of claim 1, wherein the method further includes the step of displaying data that is streamed from the mobile wireless device on the target screen device.

4. The method of claim 1, wherein the specific data includes an identification code of the target screen device, wherein the identification code of the target screen device is used to retrieve wireless connection parameters from a data storage.

5. A system for automatically establishing a wireless connection between a target screen device and a mobile wireless device to enable streaming of multimedia data, the system comprising:
　a mobile wireless device comprising:
　　a dynamic image code decoding software;
　　a camera;
　　data; and
　a target screen device;
　wherein the target screen device is configured to automatically create an initial dynamic image code which includes specific data which enables wireless connection of the mobile device with the target screen device, wherein the target screen device is configured to display said initial dynamic image code on the target screen device, until a connection with a mobile wireless device is established, wherein the mobile wireless device is configured to capture said initial dynamic image code, wherein the mobile wireless device is configured to decode the initial dynamic image code for retrieving the wireless connection parameters that are associated with the target screen device, wherein the mobile wireless device is configured to establish a wireless connection between the target screen device and the mobile wireless device for enabling multimedia data streaming by the mobile wireless device based on the specific data, wherein the target screen device is configured to automatically generate and display a new dynamic image code when a connection between a mobile wireless device and the target screen device is terminated, wherein the new dynamic image code includes specific data that includes wireless network parameters having at least one value equal to at least one value of the wireless network parameters of the initial dynamic image code and a new stream encryption key; and wherein the mobile device is configured to restore the wireless connection with the target screen device for enabling continued multimedia data streaming by the mobile wireless device based on the specific data from the new generated dynamic code.

6. The system of claim 5, wherein the dynamic image code decoding software is running on the mobile wireless device.

7. The system of claim 5, wherein the dynamic image code decoding software is a Software As a Service (SAAS) that is running on a cloud.

8. The system of claim 5, wherein the mobile wireless device further includes a User Interface (UI) that presents all available target screen devices in order to allow the correct identification of the target screen device.

9. The system of claim 5, wherein the target screen device is displaying data that is streamed from the mobile wireless device.

10. The system of claim 5, wherein specific data of the initial dynamic image code that enable connection between a mobile wireless device and the target screen device further includes at least one of: Media Access Control (MAC) address, Service Set Identifier (SSID), WiFi encryption key, PIN-code, Internet Protocol (IP) address, and other parameters.

11. The system of claim 5, wherein the specific data of the initial and new dynamic image codes includes an identification code of the target screen device, wherein the identification code of the target screen device is used to retrieve wireless connection parameters from a data storage.

* * * * *